(12) United States Patent
Kalach et al.

(10) Patent No.: US 11,838,424 B2
(45) Date of Patent: Dec. 5, 2023

(54) AUTHENTICATED ENCRYPTION APPARATUS WITH INITIALIZATION-VECTOR MISUSE RESISTANCE AND METHOD THEREFOR

(71) Applicant: HUAWEI TECHNOLOGIES CO., LTD., Guangdong (CN)

(72) Inventors: Kassem Kalach, Waterloo (CA); Ali Abbassi, North York (CA); Teng Wu, Waterloo (CA)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 17/319,732

(22) Filed: May 13, 2021

(65) Prior Publication Data

US 2022/0376922 A1  Nov. 24, 2022

(51) Int. Cl.
| | |
|---|---|
| H04L 29/06 | (2006.01) |
| G06F 21/00 | (2013.01) |
| H04L 9/32 | (2006.01) |
| H04L 9/06 | (2006.01) |
| H04L 9/08 | (2006.01) |

(52) U.S. Cl.
CPC .......... *H04L 9/3242* (2013.01); *H04L 9/0631* (2013.01); *H04L 9/0637* (2013.01); *H04L 9/0643* (2013.01); *H04L 9/0656* (2013.01); *H04L 9/0861* (2013.01)

(58) Field of Classification Search
None
See application file for complete search history.

(56) References Cited

U.S. PATENT DOCUMENTS 10,826,708 B2 * 11/2020 Campagna ............ H04L 9/3242
11,361,174 B1 *  6/2022 Robshaw ............ G06K 7/10366
(Continued)

FOREIGN PATENT DOCUMENTS

| | | |
|---|---|---|
| CN | 112152805 A | 12/2020 |
| KR | 20180113288 A | 10/2018 |

OTHER PUBLICATIONS

Tutorials Programming "Functional Programming—Tuples". Internet Archive WayBack Machine Aug. 17, 2020, from https://web.archive.org/web/20200817022141/https://www.tutorialspoint.com/functional_programming/functioal_programming_tuple.htm pp. 1-3.*
P. Rogaway/T.Shrimpton—Deterministic Authenticated-Encryption, A Provable-Security Treatment of the Key-Wrap Problem—Aug. 20, 2007.
Chanathip Namprempre/ Phillip Rogaway/ Thomas Shrimpton—Reconsidering Generic Composition—Mar. 19, 2014.
(Continued)

*Primary Examiner* — Lisa C Lewis
(74) *Attorney, Agent, or Firm* — Locke Lord LLP; Tim Tingkang Xia, Esq.

(57) ABSTRACT

A module has a processor for executing an encryption process to encrypt a message to a cipher-text with authentication. The encryption process includes generating a tag from a secret message authentication code (MAC) key, a nonce, a message, and optionally an additional data using a Poly1305 function, generating a pseudorandom initialization vector (IV) from a secret encryption key and the tag using a first encryption function, and generating a cipher-text from the secret encryption key, the generated IV, and the message using a second encryption function. The module or a similar module may execute a corresponding decryption process to decrypt the cipher-text to a decrypted message and verify the authenticity of the cipher-text. At least one of the first and second encryption functions may be an Advanced Encryption Standard (AES) encryption function such as an AES-CTR encryption function, an AES-like encryption function, and/or other suitable encryption functions.

18 Claims, 4 Drawing Sheets

(56) References Cited

U.S. PATENT DOCUMENTS

| | | | |
|---|---|---|---|
| 2002/0091931 A1* | 7/2002 | Quick, Jr. | H04L 9/14 |
| | | | 713/185 |
| 2017/0201499 A1* | 7/2017 | McLaughlin | H04W 12/122 |
| 2017/0272239 A1 | 9/2017 | Minematsu | |
| 2019/0356468 A1* | 11/2019 | Zeh | H04L 9/0631 |
| 2020/0235914 A1 | 7/2020 | Zhang et al. | |

OTHER PUBLICATIONS

D. Harkins-Aruba Networks—Synthetic Initialization Vector (SIV) Authenticated Encryption Using the Advanced Encryption Standard (AES)—Oct. 2008.

S. Gueron/ University of Haifa and Amazon/ A. Langley/ Google LLC/ Y. Lindell/ Bar-Ilan University and Unbound Tech—AES-GCM-SIV: Nonce Misuse-Resistant Authenticated Encryption.

Y. Nir/ Dell EMC/ A. Langley/ Google, Inc.—ChaCha20 and Poly1305 for IETF Protocols—Jun. 2018.

Morris Dworkin—Recommendation for Block Cipher Modes of Operation: Galois/Counter Mode (GCM) and GMAC—NIST Special Publication 800-38D—Nov. 2007.

Morris Dworkin—Recommendation for Block Cipher Modes of Operation—Methods and Techniques—NIST Special Publication 800-38A—2001 Edition.

Christof Beierle Philipp Jovanovic, Martin M. Lauridsen, Gregor Leander, and Christian Rechberger—Analyzing Permutations for AES-like Ciphers: Understanding ShiftRows.

PCT International Search Report in Respect of International Application PCT/CN2022/086570, dated Jun. 28, 2022.

* cited by examiner

AUTHENTICATED ENCRYPTION APPARATUS WITH INITIALIZATION-VECTOR MISUSE RESISTANCE AND METHOD THEREFOR

FIELD OF THE DISCLOSURE

The present disclosure relates generally to an encryption module, apparatus, system and method, and in particular to an authenticated encryption module, apparatus, system and method using Poly1305 and message authentication code (MAC) function for initialization-vector (IV) generation and authentication with IV-misuse resistance.

The present disclosure is a first patent application filed in the United States. Further applications may be filed at the World Intellectual Property Organization (WIPO) as a PCT application and/or filed in various countries, claiming priority to the US patent application.

BACKGROUND

For ease of reading, subsection C of the Detailed Description lists the acronyms used in this disclosure.

Data encryption and decryption technologies have been widely used for secure communications, secure data storage, and the like, for preventing unauthorized access to the data. Generally, a data encryption technology converts unencrypted data (also called messages or plaintexts) into encrypted data (also called cipher-texts) using predefined secret keys such that one cannot derive the unencrypted data from the encrypted data without the knowledge of at least some of the secret keys.

Data encryption and decryption technologies may be categorized as stream ciphers which encrypt and decrypt a digit of the unencrypted data at a time, and block ciphers which encrypt and decrypt a block of the unencrypted data at a time. ChaCha is an example of stream ciphers. The Advanced Encryption Standard (AES) established by the U.S. National Institute of Standards and Technology (NIST) is an example of block ciphers (see reference R7).

In block ciphers, initialization vectors (IVs) are often used in encryption to ensure that encryption of two identical messages would not result in the same cipher-texts, thereby preventing attackers from inferring the relationships between segments of the encrypted data.

Data encryption and decryption technologies may also be categorized into asymmetrical-key encryption/decryption technologies wherein the encryption and decryption sides use different keys for encryption and decryption, and symmetrical-key encryption/decryption technologies wherein the encryption and decryption sides use the same key for encryption and decryption. Examples of asymmetrical-key encryption/decryption technologies include the Digital Signature Standard (DSS), Rivest-Shamir-Adleman (RSA), elliptic-curve cryptography, and the like. Examples of symmetrical-key encryption/decryption technologies include AES, the Data Encryption Standard (DES), RC2, Blowfish, and the like.

Merely encrypting data may not be sufficient to prevent cipher-text malleability/tampering. For example, an attacker may provide illegitimate cipher-texts to a decryption device and try to derive the knowledge of encryption (such as the secret keys) by observing the decrypted data of the illegitimate cipher-texts. The AES cipher block chaining mode (AES-CBC) and AES counter mode (AES-CTR) are two examples with vulnerability in data authentication/data integrity.

Authenticated encryption (AE) technologies (and the corresponding decryption technologies) provide both confidentiality and integrity (that is, authentication) of messages by combining encryption with message authentication codes (MACs) and using MACs for ensuring data authenticity. A MAC is a keyed hash function that, given a message of arbitrary length, generates a fixed-size short output, called a tag (also called "value" or "digest"). The MAC value or tag protects data integrity and authenticity by allowing verifiers to detect any changes in the message.

AE with associated data (AEAD) such as AES Galois/counter mode (AES-GCM) (see reference R6) is a general and secure construction of AE technologies. By using MAC function for ensuring authenticity, AEAD provides the confidentiality and integrity of messages, and the integrity of non-secret information referred to as associated/additional data (denoted "additional data").

The above-described encryption/decryption technologies have some drawbacks. For example, if the IV repeats in AES-GCM under the same key, then confidentiality of messages is completely lost.

Synthetic initialization vector (SIV) mode is an AEAD and provides IV-misuse resistance (see references R1 and R2). AEAD provides high security level for symmetric encryption as long as the underlying methods satisfy the requirements.

Recently, academia and industry have been focusing on SIV technologies. For example, the following two standards have been published:

AES-CMAC-SIV (RFC 5297) (see reference R3), which makes use of AES-CTR and cipher-based message authentication code (CMAC); and AES-GCM-SIV (RFC 8452) (see reference R4), which makes use of AES-CTR and Galois/Counter Mode (GCM).

By using SIV, these standardized technologies are IV-misuse resistant. However, the performance of AES-GCM is inferior and may not be acceptable in many applications such as streaming applications on constraint devices (for example, Internet-of-Things (IoT) devices, smart TVs, and/or the like) where hardware acceleration is inapplicable or disabled.

Similarly, the above-described SIV modes are not sufficiently efficient when the hardware acceleration is inapplicable or disabled, and thus may not fulfil the performance requirements of constraint devices such as IoT devices, smart TVs, and/or the like.

SUMMARY

This disclosure provides a novel authenticated encryption/decryption module, circuitry, apparatus, system, and method with improved security (such as improved IV-misuse resistance) and/or improved performance (such as faster computation speed).

This disclosure further provides a method for generating or otherwise producing synthetic initialization vectors (SIVs) with improved IV-misuse resistance and/or faster computation speed.

According to one aspect of this disclosure, there is provided a module, a circuitry, an apparatus, and/or a system. The module, circuitry, apparatus, and/or system comprises a processor for executing an encryption process and/or a decryption process for encrypting messages into cipher-texts and/or decrypting cipher-texts into messages.

The encryption process comprises an authentication sub-process for authentication of the messages and an encryption sub-process for encrypting the messages. The authentication sub-process comprises a Poly1305 function and a message authentication code (MAC) encryption function. The encryption sub-process comprises a message-encryption function.

Herein, the Poly1305 function may be the original Poly1305 using the AES encryption function for pseudo-randomness, or alternatively other Poly1305 without using AES such as ChaCha20-Poly1305, XChaCha20-Poly1305, or the like. The MAC-encryption function acts as a cryptographic pseudo-random function (PRF) which is a deterministic function for encrypting the inputs thereof and generating a pseudorandom number indistinguishable from random sequences.

For each message M, the Poly1305 function generates a tag T (which is a MAC) from a nonce N, the message M, and optionally an additional data A using a secret MAC key K1, and the MAC-encryption function encrypts the tag T using a secret encryption key K2 and generates a pseudorandom IV. The message-encryption function then encrypts the message M into a cipher-text C using the IV and the secret encryption key K2.

Herein, the Poly1305 function acts as a MAC function for generating a MAC for each message M, and the MAC-encryption function acts as a PRF for encrypting the MAC generated by the Poly1305 function 404 using the secret encryption key K2 and generating a pseudorandom IV. Such an IV is a SIV as it is "synthesized" from the message M.

In some embodiments, the nonce N, the IV, the cipher-text C, and the optional additional data A are formed into a tuple for transmission or storage, which may be later decrypted by the decryption process.

In some embodiments, the tuple is a concatenation of the nonce N, the IV, the cipher-text C, and the optional additional data A.

In some embodiments, the encryption process further comprises a key derivation function for generating the secret MAC key and the secret encryption key from a secret value.

In some embodiments, the MAC-encryption function may be an Advanced Encryption Standard (AES) encryption function such as an AES counter mode (AES-CTR) encryption function. Thus, the authentication sub-process (which may be denoted as "Poly1305+AES") replaces the cipher block chaining (CBC) MAC (CBC-MAC) in the standard SIV mode (see reference R3).

In some embodiments, the MAC-encryption function may be an AES-like encryption function.

In some embodiments, the AES-like encryption function is a block cipher $E_K$ which is parametrized by a fixed key K, the state dimension M×N, the word size m, the number of rounds T and a permutation parameter $\pi = \pi_0, \ldots, \pi_{T-1}$, where each $\pi_t$ is a permutation on $\mathbb{Z}_M \times \mathbb{Z}_N$ ($\mathbb{Z}_n$ representing the group of integers modulo n and the set $\{0, 1, \ldots, n-1\}$). It is composed of round functions $\mathcal{R}_t$, subject to (s.t.) $E_K = \mathcal{R}_{T-1} \circ \ldots \circ \mathcal{R}_0$. Each round function is composed of the following bijective transformations on states, s.t. $\forall t \in \mathbb{Z}_T$: $\mathcal{R}_t = \text{AddRoundKey}_t \circ \text{Permute}_{\pi_t} \circ \text{MixColumns}_t \circ \text{SubBytes}$:

(i) SubBytes substitutes each word of the state according to one or several S-boxes S: $\mathbb{F}_2^n \to \mathbb{F}_2^m$, where $\mathbb{F}_2^m$ represents a m-bit binary string (i.e., each bit in the finite field of size 2).

(ii) MixColumns$_t$ applies, in round t, for all columns $j \in \mathbb{Z}_N$ left-multiplication by an M×M matrix $M_j^t \in (\mathbb{F}_2^m)^{M \times M}$.

$$\text{MixColumns}_t: (\mathbb{F}_2^m)^{M \times N} \to (\mathbb{F}_2^m)^{M \times N}$$

$$\forall j \in \mathbb{Z}_N : (X_{0,j}, \ldots, X_{M-1,j})^T \to M_j^t \cdot (X_{0,j}, \ldots, X_{M-1,j})^T,$$

where multiplication in is defined by an arbitrary irreducible polynomial over $\mathbb{F}_2$ of degree m.

(iii) Permute$_{\pi_t}$ permutes, in round t, the words within the state due to a given permutation $\pi_t$. For a position $(i,j) \in \mathbb{Z}_M \times \mathbb{Z}_N$ in the state, $\pi_t(i,j)$ gives the new position of that word under the permutation $\pi_t$:

$$\text{Permute}_{\pi_t}: (\mathbb{F}_2^m)^{M \times N} \to (\mathbb{F}_2^m)^{M \times N}$$

$$\forall i \in \mathbb{Z}_M: \forall j \in \mathbb{Z}_N: X_{i,j} \to X_{\pi_t(i,j)}.$$

(iv) AddRoundKey$_t$ performs word-wise XOR to the state using the t-th round key.

In some embodiments, the MAC-encryption function may be a block-cipher encryption function acting as a PRF for outputting the pseudorandom IV.

In some embodiments, the MAC-encryption function may be another suitable cipher such as Chacha20, XChacha20, and/or the like.

The decryption process comprises a decryption sub-process comprising a decryption function corresponding to the message-encryption function of the encryption process and a verification sub-process comprising the same Poly1305 function and MAC-encryption function as those of the encryption process.

When the decryption process receives an above-described tuple, the decryption process extracts the nonce N, the IV, the cipher-text C, and the optional additional data A. The decryption function of the decryption sub-process decrypts the cipher-text C into a decrypted message M' using the extracted IV and the secret encryption key K2. The Poly1305 function of the verification sub-process generates a tag T' from the extracted nonce N, the decrypted message M', and optionally the extracted additional data A using the secret MAC key K1. The MAC-encryption function of the verification sub-process generates an IV, denoted as IV', from the tag T' using the secret encryption key K2. Then, the verification sub-process compares IV' with the extracted IV. The decrypted message M' is accepted if IV' and IV are the same, and the decrypted message M' is rejected if IV' and IV are different.

The accepted message M' may be output for use and/or for further processing.

In some embodiments, the message-encryption function is an AES encryption function such as an AES-CTR encryption function. Correspondingly, the decryption function is an AES decryption function such as an AES-CTR decryption function.

In some embodiments, the message-encryption function is an AES-like encryption function. Correspondingly, the decryption function is an AES-like decryption function.

In some embodiments, the message-encryption function is a block-cipher encryption function. Correspondingly, the decryption function is a block-cipher decryption function.

According to one aspect of this disclosure, there is provided an encryption process for encrypting a message M into a cipher-text C with authentication. The encryption process comprises the following steps: (i) feeding the message M, a nonce N, and optionally an additional data A to a Poly1305 function having a secret MAC key K1 to obtain a tag T; (ii) using an AES encryption function having a secret encryption key K2 to encrypt the tag T into a value IV; (iii) using an AES-CTR encryption function having the secret encryption key K2 to encrypt the plaintext M into a cipher-text C using the IV; and (iv) outputting the tuple (N, IV, C) (or a tuple (N, IV, C, A) if the additional data A is provided).

In some embodiments, the tuple may be implemented as the concatenation of the values thereof.

According to one aspect of this disclosure, there is provided a decryption process for decrypting and verifying a message from a received tuple (N, IV, C) (or a tuple (N, IV, C, A) if the additional data A is provided). The decryption process comprises the following steps: (i) using an AES-CTR decryption function having a secret encryption key K2 to decrypt a cipher-text C into a decrypted message M' using an IV extracted from a received tuple (N, IV, C) or (N, IV, C, A); (ii) using the Poly1305 function having the secret MAC key K1 to obtain an calculated IV from the decrypted message M' and a nonce N extracted from the received tuple; (iii) if the extracted IV is equal to the calculated IV, the decrypted message M' is authentic and is accepted; and (iv) if the extracted IV is not equal to the calculated IV, the decrypted message M' is illegitimate and is rejected.

The module, circuitry, apparatus, system, and associated encryption and decryption processes disclosed herein provide significant performance and security advantages. As Poly1305 is efficient in software, the above-described combination of Poly1305 and AES for generating the IV provides improved performance. For example, in embodiments where the module, circuitry, apparatus, or system has no hardware acceleration, the performance of the encryption and decryption processes is about 30% faster than that of AES Galois/counter mode (AES-GCM). Theoretical and experimental results show that, by using Poly1305 for MAC, the encryption and decryption processes disclosed herein is faster than conventional SIV-generation methods and may be one of the fastest SIV modes.

Moreover, the module, circuitry, apparatus, system, and associated encryption and decryption processes disclosed herein provide improved security than that of AES-GCM. More specifically, the encryption and decryption processes disclosed herein not only provides confidentiality and integrity similar to GCM, but also provides IV-misuse resistance that GCM cannot provide. Theoretical and experimental results show that the encryption and decryption processes disclosed herein may be one of the strongest AEAD security models.

With above-described performance and security advantages, the module, circuitry, apparatus, system, and associated encryption and decryption processes disclosed herein may be suitable for use in various applications that require fast and efficient authenticated encryption and/or fast and efficient decryption with verification. The module, circuitry, apparatus, system, and associated encryption and decryption processes disclosed herein may also be suitable for use in constraint devices (such as Internet-of-Things (IoT) devices, smart TVs, and/or the like) with no or disabled hardware acceleration.

According to one aspect of this disclosure, the above-described authentication sub-process may be used as an IV-generation process, and there is provided an IV-generation module, a circuitry, an apparatus, and/or a system for executing the IV-generation process to generate an IV from a message. The IV-generation module, circuitry, apparatus, and/or system comprises a processor for generating a tag from at least a nonce, and the message using a Poly1305 function with a secret MAC key, and generating the IV from the tag using an encryption function with a secret encryption key. The encryption function is a deterministic function for encrypting the input thereof and generating a pseudorandom number as the second IV.

In some embodiments, the encryption function of the IV-generation process, module, circuitry, apparatus, and/or system is an AES encryption function or an AES-like encryption function.

In some embodiments, the encryption function of the IV-generation process, module, circuitry, apparatus, and/or system is an AES-CTR encryption function.

In some embodiments, the encryption function of the IV-generation process, module, circuitry, apparatus, and/or system may be a block-cipher encryption function acting as a PRF for outputting the pseudorandom IV.

According to one aspect of this disclosure, there is provided an authenticated encryption module for encrypting a message into a cipher-text. The authenticated encryption module comprises a processor for: producing, using a Poly1305 function, a tag from at least a secret MAC key, a nonce, and the message; producing, using a first encryption function a pseudorandom IV from a secret encryption key and the tag using a first encryption function; and producing, using a second encryption function, the cipher-text from the secret encryption key, the produced IV, and the message.

In some embodiments, the processor is configured for producing, using a key derivation function, the secret MAC key and the secret encryption key from a secret value.

In some embodiments, the processor is configured for outputting a tuple comprising at least the nonce, the IV, and the cipher-text.

In some embodiments, at least one of the first and the second encryption functions is an Advanced Encryption Standard (AES) encryption function or an AES-like encryption function.

In some embodiments, at least one of the first and the second encryption functions is an AES counter mode (AES-CTR) encryption function.

In some embodiments, at least one of the first and the second encryption functions is a block cipher or encryption function for outputting the pseudorandom IV.

According to one aspect of this disclosure, there is provided an authenticated encryption method for encrypting a message into a cipher-text. The authenticated encryption method comprises: producing, using a Poly1305 function, a tag from at least a secret MAC key, a nonce, and the message; producing, using a first encryption function, a pseudorandom IV from inputs of a secret encryption key and the tag; and producing, using a second encryption function, the cipher-text from the secret encryption key, the produced IV, and the message.

In some embodiments, the authenticated encryption method further comprises producing, using a key derivation function, the secret MAC key and the secret encryption key from a secret value.

In some embodiments, the authenticated encryption method further comprises outputting a tuple comprising at least the nonce, the IV, and the cipher-text.

In some embodiments, at least one of the first and the second encryption functions is an AES encryption function or an AES-like encryption function.

In some embodiments, at least one of the first and the second encryption functions is an AES-CTR encryption function.

In some embodiments, at least one of the first and the second encryption functions is a block cipher or encryption function for outputting the pseudorandom IV.

According to one aspect of this disclosure, there is provided one or more non-transitory computer-readable storage devices comprising computer-executable instructions for encrypting a message into a cipher-text with authentication. The instructions, when executed, cause a processor to perform actions comprising: producing, using a Poly1305 function, a tag from at least a secret MAC key, a nonce, and the message; producing, using a first encryption function, a pseudorandom IV from a secret encryption key and the tag; and producing, using a second encryption function, the cipher-text from the secret encryption key, the produced IV, and the message.

In some embodiments, the instructions, when executed, cause the processor to perform further actions comprising producing, using a key derivation function, the secret MAC key and the secret encryption key from a secret value.

In some embodiments, the instructions, when executed, cause the processor to perform further actions comprising outputting a tuple comprising at least the nonce, the IV, and the cipher-text.

In some embodiments, at least one of the first and the second encryption functions is an AES encryption function or an AES-like encryption function.

In some embodiments, at least one of the first and the second encryption functions is an AES-CTR encryption function.

In some embodiments, at least one of the first and the second encryption functions is a block cipher or encryption function for outputting the pseudorandom IV.

According to one aspect of this disclosure, there is provided a decryption module for decrypting a cipher-text into a message and verifying an authenticity of the cipher-text. The decryption module comprises a processor for: producing, using a decryption function, a decrypted message from a secret encryption key, a received first IV, and the cipher-text; producing, using a Poly1305 function, a tag from at least a secret MAC key, a received nonce, and the decrypted message; producing, using an encryption function, a pseudorandom second IV from the secret encryption key and the tag; accepting the decrypted message if the first and second IV are same; and rejecting the decrypted message if the first and second IV are different.

In some embodiments, the processor is configured for producing, using a key derivation function, the secret MAC key and the secret encryption key from a secret value.

In some embodiments, the decryption function is an AES decryption function or an AES-like decryption function.

In some embodiments, the decryption function is an AES-CTR decryption function.

In some embodiments, the encryption function is an AES encryption function or an AES-like encryption function.

In some embodiments, the encryption function is an AES-CTR encryption function.

In some embodiments, the encryption function is a block cipher or encryption function for outputting the pseudorandom IV.

According to one aspect of this disclosure, there is provided a decryption method for decrypting a cipher-text into a message and verifying an authenticity of the cipher-text. The decryption method comprises: producing, using a decryption function, a decrypted message from a secret encryption key, a received first IV, and the cipher-text; producing, using a Poly1305 function, a tag from at least a secret MAC key, a received nonce, and the decrypted message; producing, using an encryption function, a pseudorandom second IV from inputs of the secret encryption key and the tag; accepting the decrypted message if the first and second IV are same; and rejecting the decrypted message if the first and second IV are different.

In some embodiments, the decryption method further comprises producing, using a key derivation function, the secret MAC key and the secret encryption key from a secret value.

In some embodiments, the decryption function is an AES decryption function or an AES-like decryption function.

In some embodiments, the decryption function is an AES-CTR decryption function.

In some embodiments, the encryption function is an AES encryption function or an AES-like encryption function.

In some embodiments, the encryption function is an AES-CTR encryption function.

In some embodiments, the encryption function is a block cipher or encryption function for outputting the pseudorandom IV.

According to one aspect of this disclosure, there is provided one or more non-transitory computer-readable storage devices comprising computer-executable instructions for decrypting a cipher-text into a message and verifying an authenticity of the cipher-text. The instructions, when executed, cause a processor to perform actions comprising: producing, using a decryption function, a decrypted message from a secret encryption key, a received first IV, and the cipher-text; producing, using a Poly1305 function, a tag from at least a secret MAC key, a received nonce, and the decrypted message; producing, using an encryption function, a pseudorandom second IV from the secret encryption key and the tag; accepting the decrypted message if the first and second IV are same; and rejecting the decrypted message if the first and second IV are different.

In some embodiments, the instructions, when executed, cause the processor to perform further actions comprising producing, using a key derivation function, the secret MAC key and the secret encryption key from a secret value.

In some embodiments, the decryption function is an AES decryption function or an AES-like decryption function.

In some embodiments, the decryption function is an AES-CTR decryption function.

In some embodiments, the encryption function is an AES encryption function or an AES-like encryption function.

In some embodiments, the encryption function is an AES-CTR encryption function.

In some embodiments, the encryption function is a block cipher or encryption function for outputting the pseudorandom IV.

According to one aspect of this disclosure, there is provided a module for producing an IV from a message. The module comprises a processor for: producing, using a Poly1305 function, a tag from at least a secret MAC key, a nonce, and the message; and producing, using an encryption function, a pseudorandom number as the IV from a secret encryption key and the tag.

In some embodiments, the encryption function is an AES encryption function or an AES-like encryption function.

In some embodiments, the encryption function is an AES-CTR encryption function.

In some embodiments, the encryption function is a block cipher or encryption function for outputting the pseudorandom IV.

According to one aspect of this disclosure, there is provided a method for generating an IV from a message. The method comprises: producing, using a Poly1305 function, a tag from at least a secret MAC key, a nonce, and the message; and producing, using an encryption function, a pseudorandom number as the IV from a secret encryption key and the tag.

In some embodiments, the encryption function is an AES encryption function or an AES-like encryption function.

In some embodiments, the encryption function is an AES-CTR encryption function.

In some embodiments, the encryption function is a block cipher or encryption function for outputting the pseudorandom IV.

According to one aspect of this disclosure, there is provided one or more non-transitory computer-readable storage devices comprising computer-executable instructions for producing an IV from a message. The instructions, when executed, cause a processor to perform actions comprising: producing, using a Poly1305 function, a tag from at least a secret MAC key, a nonce, and the message; and producing, using an encryption function, a pseudorandom number as the IV from a secret encryption key and the tag.

In some embodiments, the encryption function is an AES encryption function or an AES-like encryption function.

In some embodiments, the encryption function is an AES-CTR encryption function.

In some embodiments, the encryption function is a block cipher or encryption function for outputting the pseudorandom IV.

DETAILED DESCRIPTION

Figure 1:
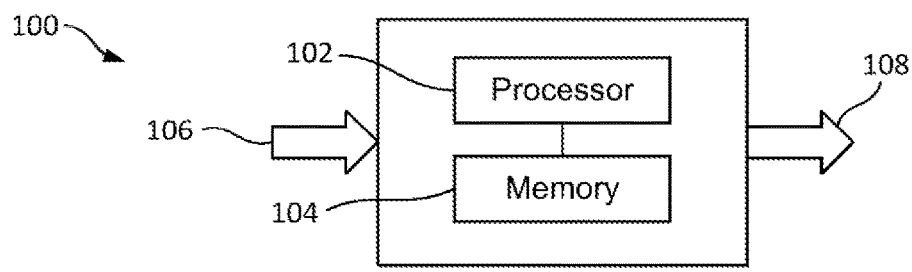
FIG. 1 is a simplified schematic diagram showing the hardware structure of an encryption/decryption module, according to some embodiments of this disclosure.

Embodiments disclosed herein relate to an encryption/decryption module or circuitry for executing an encryption process and/or a decryption process for performing data encryption and/or decryption.

As will be described later in more detail, a "module" is a term referring to a hardware structure such as a circuitry implemented using suitable technologies such as suitable electrical and/or optical technologies (and with more specific examples of semiconductors) for performing defined operations or processings. A "module" may alternatively refer to the combination of a hardware structure and a software structure, wherein the hardware structure may be implemented using suitable technologies such as suitable electrical and/or optical technologies (and with more specific examples of semiconductors) in a general manner for performing defined operations or processings according to the software structure in the form of a set of instructions stored in one or more non-transitory, computer-readable storage devices or media.

As will be described in more detail below, the encryption/decryption module may be a part of a device, an apparatus, a system, and/or the like, wherein the encryption/decryption module may be coupled to or integrated with other parts of the device, apparatus, or system such that the combination thereof forms the device, apparatus, or system. Alternatively, the encryption/decryption module may be implemented as a standalone encryption/decryption device or apparatus.

The encryption/decryption module executes an encryption process and/or a decryption process for performing data encryption and/or decryption. Herein, a process has a general meaning equivalent to that of a method, and does not necessarily correspond to the concept of computing process (which is the instance of a computer program being executed). More specifically, a process herein is a defined method implemented using suitable hardware components for process data (for example, encrypting a message, decrypting a message, generating an initialization vector (IV) (described in more detail later), and/or the like. A process may comprise or use one or more functions for processing data as designed. Herein, a function is a defined sub-process or sub-method for computing, calculating, or otherwise processing input data in a defined manner and generating or otherwise producing output data.

As those skilled in the art will appreciate, the encryption and decryption processes disclosed herein may be implemented as one or more software and/or firmware programs having necessary computer-executable code or instructions and stored in one or more non-transitory computer-readable storage devices or media which may be any suitable volatile and/or non-volatile, non-removable or removable storage devices such as RAM, ROM, EEPROM, solid-state memory devices, hard disks, CDs, DVDs, flash memory devices, and/or the like. The encryption/decryption module 100 may read the computer-executable code from the storage devices and execute the computer-executable code to perform the encryption and/or decryption processes.

Alternatively, the encryption and/or decryption processes disclosed herein may be implemented as one or more hardware structures having necessary electrical and/or optical components, circuits, logic gates, integrated circuit (IC) chips, and/or the like.

A. HARDWARE STRUCTURE

Turning now the FIG. 1, an encryption/decryption module is shown and is generally identified using reference numeral 100. In various embodiments, the encryption/decryption module 100 may be an encryption module for encrypting one or more messages M (also denoted "plaintexts" hereinafter) into one or more cipher-texts C, a decryption module for decrypting one or more cipher-texts C into one or more messages M, or an encryption and decryption module for encrypting or decrypting data (which may be messages when encrypting or cipher-texts when decrypting) under respective instructions.

In other words, one may only implement the encryption portion of the encryption/decryption module 100 as the encryption module for encrypting one or more messages M into one or more cipher-texts C, and rely on other people to implement the corresponding decryption module for decrypting one or more cipher-texts C back to the one or more messages M.

Alternatively, one may only implement the decryption portion of the encryption/decryption module 100 as the decryption module for decrypting one or more cipher-texts C into one or more messages M wherein the one or more cipher-texts C are encrypted from the one or more messages M by corresponding encryption module implemented by other people.

Yet alternatively, one may implement both the encryption and decryption portions of the encryption/decryption module 100 for encrypting one or more messages M into one or more cipher-texts C, and decrypting the one or more cipher-texts C back to the one or more messages M at a later time and/or another location.

As shown in FIG. 1, the encryption/decryption module 100 comprises a processor 102 functionally coupled to a memory component 104, one or more input circuits 106 (also denoted as "input" for simplicity), and one or more output circuits 108 (also denoted as "output" for simplicity) using suitable electrical and/or optical technologies. The encryption/decryption module 100 may also comprise other components as needed, such as one or more buses, one or more controller circuits, and/or the like.

The processor 102 comprises necessary circuitries implemented using suitable technologies such as suitable electrical and/or optical hardware components for executing an encryption process and/or a decryption process, as the design purpose and/or the use case maybe, for encrypting and/or decrypting data received from the input 106 and outputting the resulting encrypted or decrypted data through the output 108.

For example, the processor 102 may comprise logic gates implemented by semiconductors to perform various computations, calculations, and/or processings. Examples of logic gates include AND gate, OR gate, XOR (exclusive OR) gate, and NOT gate, each of which takes one or more inputs and generates or otherwise produces an output therefrom based on the logic implemented therein. For example, a NOT gate receives an input (for example, a high voltage, a state with electrical current, a state with an emitted light, or the like), inverts the input (for example, forming a low voltage, a state with no electrical current, a state with no light, or the like), and output the inverted input as the output.

While the inputs and outputs of the logic gates are generally physical signals and the logics or processings thereof are tangible operations with physical results (for example, outputs of physical signals), the inputs and outputs thereof are generally described using numerals (for example, numerals "0" and "1") and the operations thereof are generally described as "computing" (which is how the "computer" or "computing device" is named) or "calculation", or more generally, "processing", for generating or producing the outputs from the inputs thereof.

Sophisticated combinations of logic gates in the form of a circuitry of logic gates, such as the processor 102, may be formed using a plurality of AND, OR, XOR, and/or NOT gates. Such combinations of logic gates may be implemented using individual semiconductors, or more often be implemented as integrated circuits (ICs).

A circuitry of logic gates may be "hard-wired" circuitry which, once designed, may only perform the designed functions. In this example, the processes and functions thereof are "hard-coded" in the circuitry.

With the advance of technologies, it is often that a circuitry of logic gates such as the processor 102 may be alternatively designed in a general manner so that it may perform various processes and functions according to a set of "programmed" instructions implemented as firmware and/or software and stored in one or more non-transitory computer-readable storage devices or media. In this example, the circuitry of logic gates such as the processor 102 is usually of no use without meaningful firmware and/or software.

Of course, those skilled the art will appreciate that a process or a function (and thus the processor 102) may be implemented using other technologies such as analog technologies.

Therefore, the modules, circuitries, the processor 102, and other components described herein generally produce tangible results tied to the physical world, wherein the tangible results such as those described herein may lead to improvements to computers and systems, computing devices and systems, and/or the like, such as network systems having a plurality of server computers and a plurality of client computing devices.

Referring back to FIG. 1, in various embodiments, the processor 102 may be a specialized circuitry implemented as one or more individual circuits, a specialized circuitry implemented as one or more ICs using suitable technologies such as application specific integrated circuits (ASICs), field-programmable gate array (FPGA), and/or the like, a specialized processor, or a general purpose processor such as an INTEL® microprocessor (INTEL is a registered trademark of Intel Corp., Santa Clara, CA, USA), an AMD® microprocessor (AMD is a registered trademark of Advanced Micro Devices Inc., Sunnyvale, CA, USA), an ARM® microprocessor (ARM is a registered trademark of Arm Ltd., Cambridge, UK) manufactured by a variety of manufactures under the ARM® architecture, or the like.

The memory component 104 is generally used for storing data such as the input data, the data generated during the operation of the processor 102, and/or the output data. In various embodiments, the memory component 104 may be a circuitry implemented as one or more individual circuits or a circuitry implemented as one or more ICs. In some embodiments, the memory 104 may be integrated with the processor 102 in a single IC. In some other embodiments, the memory component 104 may be separated from the processor 102 but functionally coupled thereto.

Figure 2:
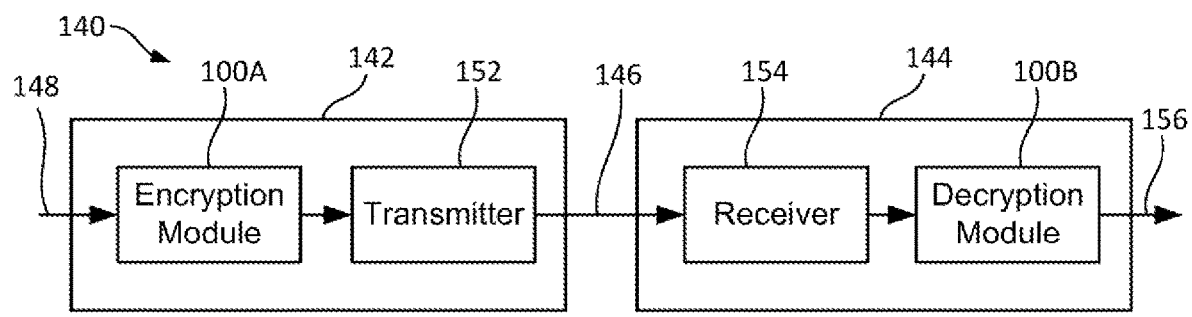
FIG. 2 is a simplified schematic diagram of a secure communication system having a transmitting device in communication with a receiving device via a suitable communication channel, wherein the transmitting and receiving devices respectively comprise an encryption module and a decryption module shown in FIG. 1, according to some embodiments of this disclosure.

In various embodiments, the encryption/decryption module 100 may be used in various secure systems and/or devices for data encryption and/or decryption. For example, FIG. 2 is a simplified schematic diagram of a secure communication system 140 having a transmitting device 142 in communication with a receiving device 144 via a suitable communication channel 146 such as an electrical cable, a fiber optic cable, a space, and/or the like.

In this example, the transmitting device 142 comprises an encryption module 100A functionally coupled to a transmitter 152. The encryption module 100A receives an input 148 having one or more messages M and encrypts the received messages M into cipher-texts C. The encryption module 100A outputs the cipher-texts C and other data (described in more detail later) to the transmitter 152, which in turn transmits the data received from the encryption module 100A to the receiving device 144 via the communication channel 146.

The receiving device 144 comprises a receiver 154 functionally coupled to a decryption module 100B. The receiver 154 receives data transmitted from the transmitting device 142 and forward the received data (which comprises cipher-texts C) to the decryption module 100B. The decryption module 100B then decrypts the cipher-texts C into one or more messages M and outputs the messages M through the output 156 for use or further processing.

Figure 3:
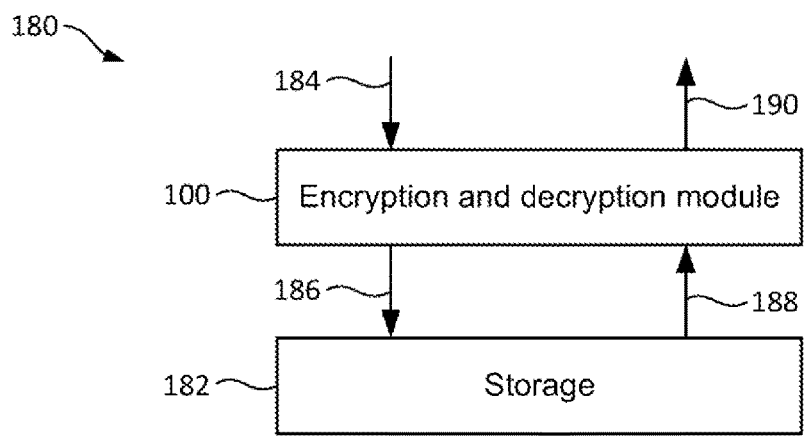
FIG. 3 is a simplified schematic diagram of a secure storage device comprising a storage module functionally coupled to an encryption/decryption module shown in FIG. 1, according to some embodiments of this disclosure.

As another example, FIG. 3 shows a secure storage device 180 comprising a storage component 182 functionally coupled to an encryption and decryption module 100. The storage component 182 may be volatile and/or non-volatile, non-removable or removable memory such as RAM, ROM, EEPROM, solid-state memory, hard disks, writable and/or rewritable CD, writable and/or rewritable DVD, flash memory, or the like.

When storing data to the secure storage device 180, the encryption and decryption module 100 receives data 184 to be written to the storage component 182, encrypts the received data 184, and writes the encrypted data 186 to the storage component 182. When reading data from the secure storage device 180, the encryption and decryption module 100 reads encrypted data 188 from the storage component 182, decrypts the encrypted data 188, and outputs the decrypted data 190.

As shown in above examples, a secure system or device generally comprises an encryption side having an encryption module for encrypting messages M into cipher-texts C and a decryption side having a decryption module for decrypting cipher-texts C into messages M. In some embodiments similar to the example shown in FIG. 2, the encryption and decryption sides may be separate devices 142 and 144, and the encryption and decryption modules may be separate modules. In some other embodiments similar to the example shown in FIG. 3, the encryption and decryption sides may be the same device 180, and the encryption and decryption modules maybe the same module.

Herein, the encryption/decryption module 100 executes an encryption process and/or a decryption process for encrypting and/or decrypting data using authenticated encryption (AE). Therefore, the encryption process generally comprises an encryption stage for encrypting messages M to cipher-texts C, and an authentication stage for generating an authentication tag. The encryption and authentication stages may be executed in any suitable order or in parallel, depending on the implementation.

Correspondingly, the decryption process generally comprises a decryption stage for decrypting cipher-texts C to messages M and a verification stage for verifying the authenticity of the cipher-texts C. The decryption and verification stages may be executed in any suitable order or in parallel, depending on the implementation.

B. ENCRYPTION AND DECRYPTION PROCESSES

Figure 4:
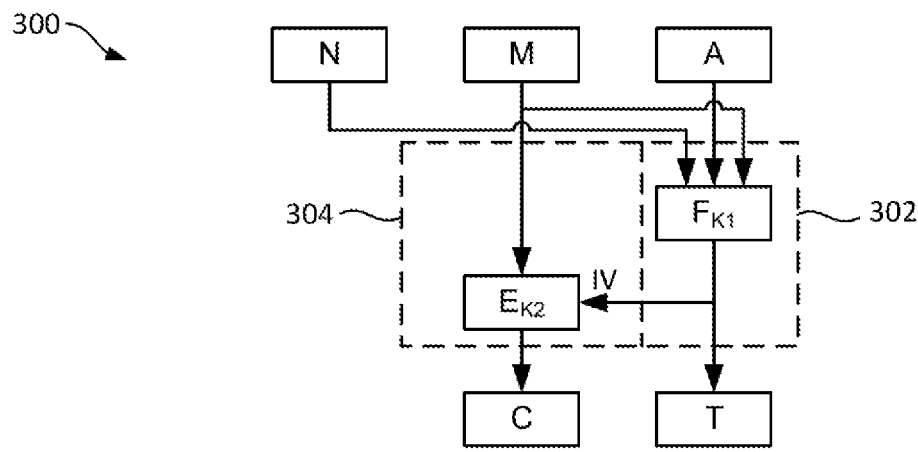
FIG. 4 is a schematic diagram showing the structure of an encryption process executable by an encryption/decryption module shown in FIG. 1, according to some embodiments of this disclosure.

FIG. 4 is a schematic diagram showing the encryption process 300 (produced based on references R1 and R2), according to some embodiments of this disclosure. As shown, on the encryption side, the encryption process 300 comprises an authentication sub-process 302 and an encryption sub-process 304.

The authentication sub-process 302 receives a nonce N, a message M, and optionally an additional data A. Herein, the nonce N is an arbitrary number (usually a random or pseudorandom number) that is only used once in encryption/decryption. The associated data is non-secret information.

The authentication sub-process 302 uses a message authentication code (MAC) function $F_{K1}$ with a secret MAC key K1 to generate a MAC or tag T (or "MAC T" for short) using the received nonce N, the message M, and the optional additional data A. The generated MAC T is an authentication "signature" (that is, as an indication that the transmitted cipher-text is legitimate), and is also used as an initialization vector (IV) in the encryption sub-process 304. As the IV is "synthesized" from the nonce N, the message M, and optionally the additional data A, it is also called a "synthetic" IV (SIV). As those skilled in the art understand, encrypting a message M using a SIV ensures that encryption of two identical messages would not result in the same cipher-texts thereby preventing an attacker from inferring the relationships between segments of the encrypted data.

The encryption sub-process 304 receives the message M and uses an encryption function $E_{K2}$ with a secret encryption key K2 to generate a cipher-text C using the received message M and the IV generated by the authentication sub-process 302.

The output of the encryption process 300 generally comprises the concatenation of the cipher-text C and the MAC T.

As those skilled in the art will appreciate, the structure of the encryption process 300 is the same as the standards RFC 5297 and RFC 8452 made by the Internet Engineering Task Force (IETF), wherein RFC 5297 (AES-CMAC-SIV) uses the Advanced Encryption Standard (AES) counter mode (AES-CTR), cipher-based message authentication code (CMAC), and SIV, and wherein RFC 8452 (AES-GCM-SIV) is based on Galois/Counter Mode (GCM) and uses AES-CTR and Galois message authentication code (GMAC) (see reference R6). Therefore, the encryption process 300 (and subsequently the decryption process) disclosed herein provides sufficient compatibility with these and other relevant standards.

Figure 5:
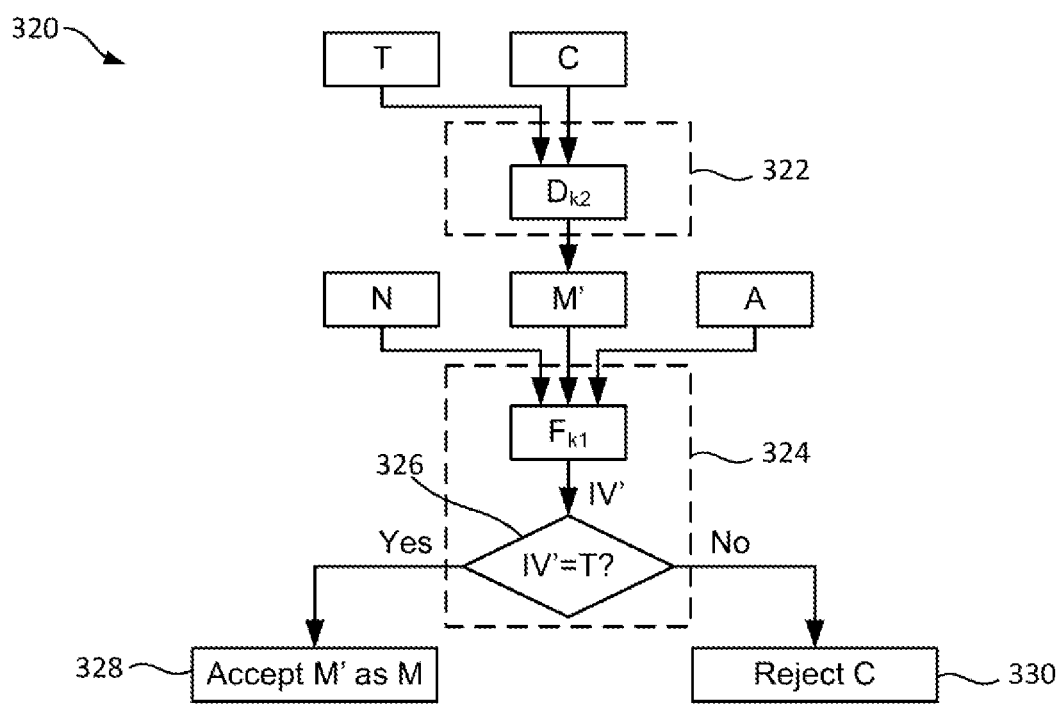
FIG. 5 is a schematic diagram showing the structure of a decryption process corresponding to the encryption process shown in FIG. 4 and executable by an encryption/decryption module shown in FIG. 1.

FIG. 5 is a schematic diagram showing a decryption process 320 corresponding to the encryption process 300. As shown, on the decryption side, the decryption process 320 comprises a decryption sub-process 322 and a verification sub-process 324.

The decryption sub-process 322 receives a cipher-text C and the associated MAC T, and uses a decryption function $D_{K2}$ with the secret encryption key K2 to decrypt the cipher-text C into a message M'.

The verification sub-process 324 uses the MAC function $F_{K1}$ with the secret MAC key K1 to generate an IV' using the message M' and the nonce N and additional data A associated with the cipher-text C. Then at step 326, the verification sub-process 324 compares the obtained IV' with the MAC T (which is the IV used by the encryption process 300 in generating the cipher-text C). If IV' and T are the same (that is, IV' equals to T), then the authenticity of the cipher-text C is confirmed and the message M' is accepted as the message M (step 328). If IV' and T are different (that is, IV' does not equal to T), then the cipher-text C may be a false cipher-text and the message M' is rejected or discarded (step 330).

Figure 6:
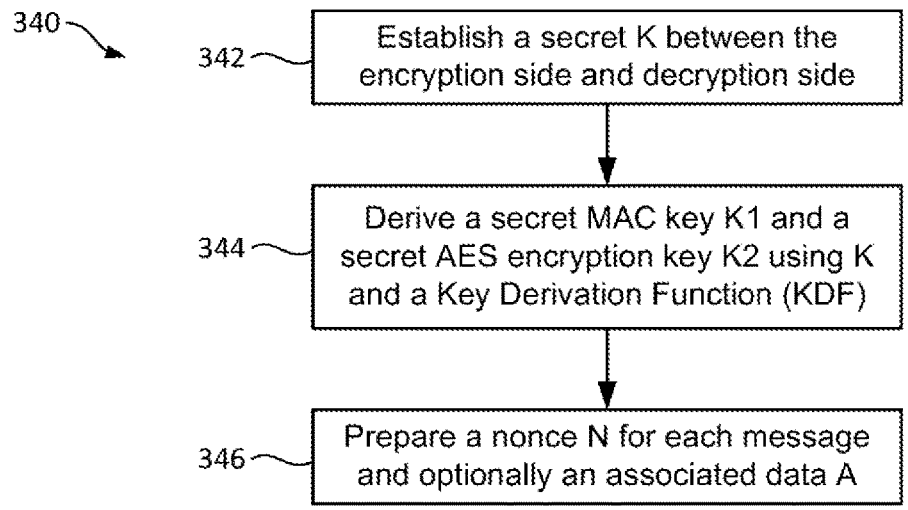
FIG. 6 is schematic diagram showing a setup stage for establishing necessary common parameters between the encryption and decryption processes shown in FIGS. 4 and 5.

As can be seen, the encryption and decryption processes 300 and 320 require some common parameters for successful message encryption and decryption. Therefore, a setup stage 340 as shown in FIG. 6 may be used to establish the necessary common parameters between the encryption and decryption processes 300 and 320.

At step 342, a secret value K (also called a "secret" for simplicity) is established between the encryption and decryption processes 300 and 320. At step 344, a key derivation function (KDF) is used for deriving the secret MAC key K1 to be used by the MAC function FK1 in the encryption and decryption processes 300 and 320, and the secret encryption key K2 to be used by the encryption function $E_{K2}$ of the encryption process 300 and by the decryption function $D_{K2}$ of the decryption process 320. At step 346, a nonce N and optionally an additional data A are prepared at the encryption side for each message M.

Figure 7:
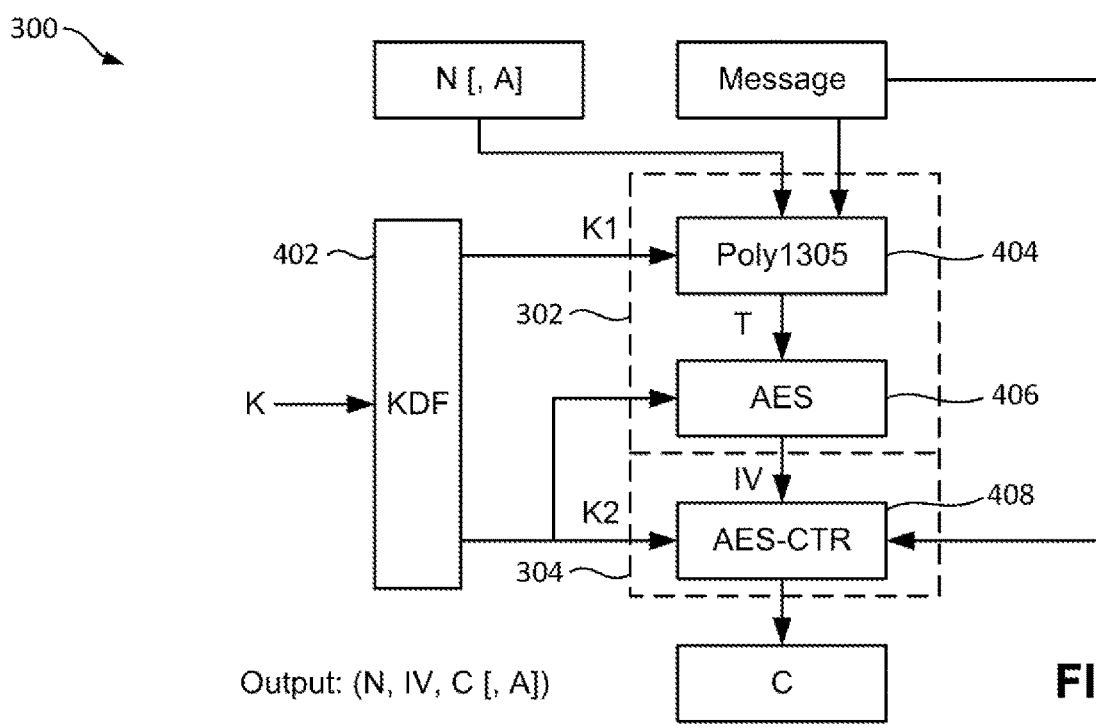
FIG. 7 is a schematic diagram showing the structure of an encryption process executable by an encryption/decryption module shown in FIG. 1, according to some embodiments of this disclosure, wherein the encryption process comprises an authentication sub-process having a Poly1305 function and an AES encryption function, and an encryption sub-process having an AES-CTR encryption function.
Figure 8:
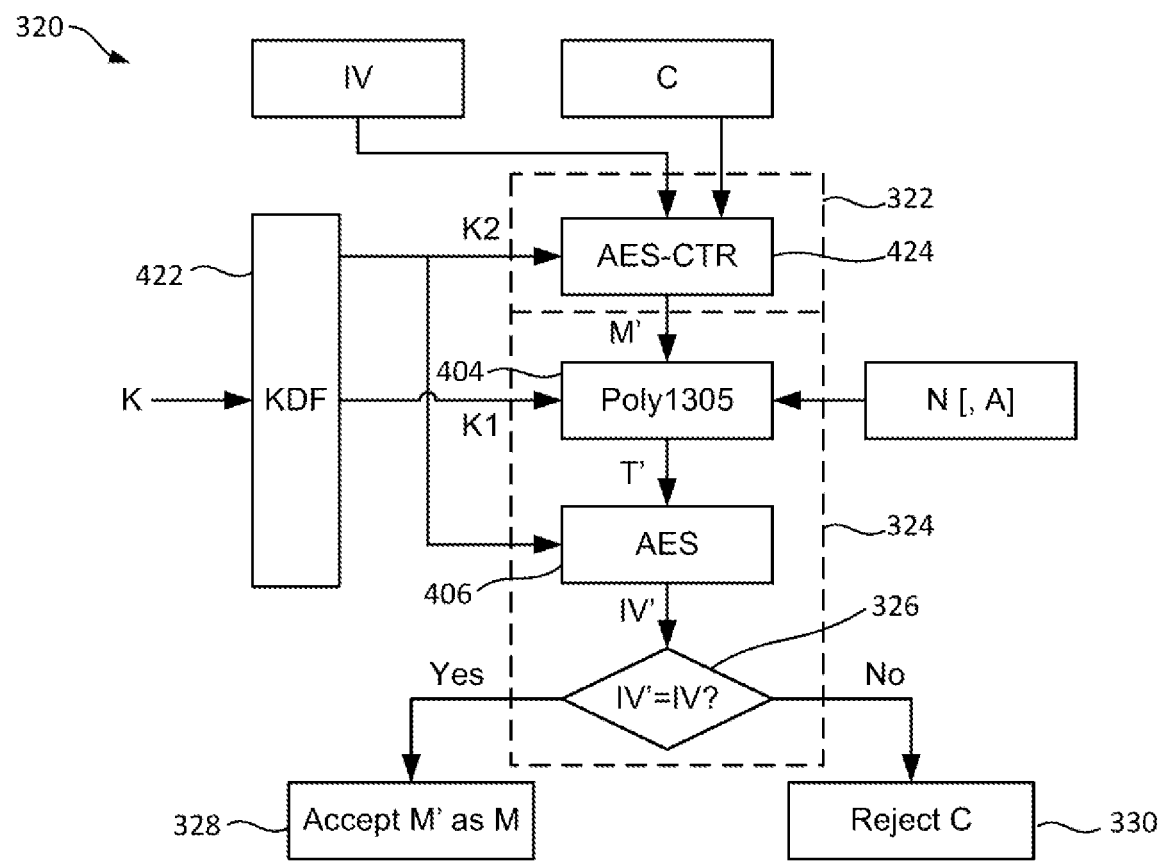
FIG. 8 is a schematic diagram showing the structure of a decryption process corresponding to the encryption process shown in FIG. 7 and executable by an encryption/decryption module shown in FIG. 1.

In some embodiments, the setup stage 340 is an initialization stage which only establishes the secret K between the encryption and decryption processes 300 and 320, and each of the encryption and decryption processes 300 and 320 comprises the same KDF for deriving the secret keys K1 and K2 (see FIGS. 7 and 8). The nonce N and the additional data A are prepared by the encryption process 300 for each message M in real-time during the execution of the encryption process 300. The prepared nonce N and additional data A are transmitted to the decryption side with the cipher-text C (described in more detail later).

In some embodiments, the setup stage 340 is an initialization stage which establishes secret keys K1 and K2. Similar to the embodiments described above, the nonce N and the additional data A are prepared by the encryption process 300 for each message M in real-time during the execution of the encryption process 300, and are transmitted to the decryption side with the cipher-text C.

Those skilled in the art will appreciate that various encryption and decryption processes 300 and 320 may be designed by choosing various MAC functions $F_{K1}$ and/or encryption functions $E_{K2}$.

FIGS. 7 and 8 show the structures of the encryption and decryption processes 300 and 320, respectively, according to some embodiments of this disclosure, wherein the notion "[, A]" indicates that the additional data A is optional.

In these embodiments, Poly1305-based Pseudo-Random Function (PRF) and MAC (that is, the combination of Poly1305 and AES) are used for authentication, thereby replacing the cipher block chaining (CBC) MAC (CBC-MAC) in the standard SIV mode (see reference R3). Herein, a PRF is a deterministic function for generating a pseudorandom number indistinguishable from random sequences.

As shown in FIG. 7, the encryption process 300 comprises a KDF 402 for generating the secret MAC key K1 and the secret encryption key K2 using the secret K, an authentication sub-process 302 using MACs, and an encryption sub-process 304 using the AES-CTR encryption function.

As described above, a secret K has been established between the encryption and decryption processes 300 and 320. For each message M, a corresponding nonce N and optionally an additional data A are generated by the encryption process 300 in real-time.

As shown in FIG. 7, the authentication sub-process 302 comprises a Poly1305 function 404 and a MAC-encryption function 406. The Poly1305 function 404 is used for computing, calculating, generating, or otherwise producing a MAC for each message M, and the MAC-encryption function 406 is a deterministic encryption function acting as a PRF for encrypting the MAC generated by the Poly1305 function 404 and outputting a pseudorandom IV indistinguishable from random sequences. In these embodiments, the MAC-encryption function 406 is a suitable AES encryption function such as an AES-CTR encryption function.

As those skilled in the art understand, AES is a symmetric block cipher based on the substitution-permutation network (SPN), with a fixed block size of 128 bits, and a key size of 128, 192, or 256 bits. AES is a subset of the Rijndael block cipher which has a block size and a key size of a multiple of 32 bits between 128 bits and 256 bits. As those skilled in the art understand, a block cipher generally comprises a block-cipher encryption function and a block-cipher decryption function. Similarly, AES generally comprises an AES encryption function and an AES decryption function. The AES encryption function generally operates a plurality of rounds with each round comprising a plurality of steps including key adding, substitution, row shifting, and column mixing.

As those skilled in the art understand, Poly1305 is a fast Carter-Wegman MAC algorithm using a 16-byte AES key, a 16-byte additional key, a 16-byte nonce, a symmetric cipher (that is, an encryption function, such as AES, ChaCha20, XChaCha20, or the like) as the input for computing, calculating, generating, or otherwise producing a 16-byte MAC or tag of a variable-length message as the output. Poly1305 is a PRF as long as the nonce does not repeat (see reference R5). Herein, the Poly1305 function may be the original Poly1305 using the AES encryption function for pseudorandomness, or alternatively other Poly1305 without using AES such as ChaCha20-Poly1305 defined in IETF RFC 8439 (see reference R5), XChaCha20-Poly1305, or the like.

As shown in FIG. 7, in these embodiments, the Poly1305 function 404 computes a tag T as the output thereof using inputs of the secret MAC key K1 (32 bytes), the nonce N (16 bytes), the message M, and optionally the additional data A (which may be any length not exceeding a predefined MAX-LENGTH).

Then, the MAC-encryption function 406 generates an IV using the secret encryption key K2 and the tag T generated from the Poly1305 function 404. The generated IV is a SIV as it is "synthetized" from the message M (via the tag T). The generated IV is passed to the encryption sub-process 304.

The encryption sub-process 304 comprises a message-encryption function 408, which in these embodiments is an AES-CTR function, to generate a cipher-text C using the IV generated in the authentication sub-process 302, the secret encryption key K2, and the message M.

The encryption process 300 then outputs a tuple (N, IV, C) or (N, IV, C, A) if the additional data A is provided. Herein, the tuple (N, IV, C [, A]), where "[, A]" represents that A is optional, is a concatenation of the nonce N, the IV generated in the authentication sub-process 302, the cipher-text C (which is the encryption of the message M), and optionally the additional data A.

FIG. 8 shows the decryption process 320 in these embodiments, which receives the tuple (N, IV, C [, A]), extracts the nonce N, the IV, the cipher-text C, and optionally the additional data A therefrom, and generates the decrypted message M with verification.

As shown in FIG. 8, the decryption process 320 comprises a KDF 422, a decryption sub-process 322, and a verification sub-process 324. The KDF 422 is the same as the KDF 402 of the encryption process 300 and generates the same secret MAC key K1 and the same secret encryption key K2 using the same secret K.

The decryption sub-process 322 comprises a decryption function 424 corresponding to the message-encryption function 408 of the encryption sub-process 304 for generating a decrypted message M' using the secret encryption key K2, the extracted IV, and the extracted cipher-text C. As the message-encryption function 408 in these embodiments is an AES-CTR encryption function, the decryption function 424 in these embodiments is a corresponding AES-CTR decryption function.

The decryption sub-process 322 outputs the decrypted message M' to the verification sub-process 324.

The verification sub-process 324 comprises the same Poly1305 function 404 and MAC-encryption function 406 as those of the encryption process 300. The Poly1305 function 404 generates a tag T' using the secret MAC key K1, the extracted nonce N, the decrypted message M', and optionally the extracted additional data A. Then, the MAC-encryption function 406 (which may be, for example, an AES-CTR encryption function) generates a verification IV, denoted as IV', using the tag T' generated by the Poly1305 function 404. At step 326, the generated IV' is compared with the extracted IV, and if IV' and IV are the same (that is, IV' is equal to IV), the authenticity of the decrypted message M' is verified, and the decrypted message M' is accepted and output as the message M (step 328). If IV' and IV are different (that is, IV' is not equal to IV), the cipher-text C may be a false cipher-text and the decrypted message M' is rejected or discarded (step 330).

Those skilled in the art will appreciate that, by using Poly1305 for generating the MAC or tag T and using AES for generating the IV, Poly1305-based PRF and MAC are achieved. More specifically, with the security properties provided by Poly1305 and AES, the combination of Poly1305 and AES as shown in FIGS. 7 and 8 results in a secure and efficient PRF.

The conventional AES Galois/counter mode (AES-GCM) and AES-GCM-SIV use Galois message authentication code (GMAC), and AES-SIV uses cipher-based message authentication code (CMAC), which are slow PRFs compared to the combination of Poly1305 and AES disclosed herein.

The encryption/decryption module 100 and the encryption and decryption processes 300 and 320 disclosed herein provide significant performance and security advantages. As Poly1305 is efficient in software, the above-described combination of Poly1305 and AES for generating the IV provides improved performance. For example, in embodiments where the encryption/decryption module 100 has no hardware acceleration, the performance of the encryption and decryption processes 300 and 320 is about 30% faster than that of AES-GCM. Theoretical and experimental results show that, by using Poly1305 for MAC, the encryption and decryption processes 300 and 320 disclosed herein is faster than conventional SIV-generation methods and may be one of the fastest SIV modes.

Moreover, the encryption/decryption module 100 and the encryption and decryption processes 300 and 320 disclosed herein provide improved security than that of AES-GCM. More specifically, the encryption and decryption processes 300 and 320 disclosed herein not only provides confidentiality and integrity similar to GCM, but also provides IV-misuse resistance that GCM cannot provide. Theoretical and experimental results show that, the encryption and decryption processes 300 and 320 disclosed herein may be one of the strongest AEAD security models.

With above-described performance and security advantages, the encryption/decryption module 100 and the encryption and decryption processes 300 and 320 disclosed herein may be suitable for use in various applications that require fast and efficient authenticated encryption and/or fast and efficient decryption with verification. The encryption/decryption module 100 and the encryption and decryption processes 300 and 320 disclosed herein may also be suitable for use in constraint devices (such as in Internet-of-Things (IoT) devices, smart TVs, and/or the like) with no hardware acceleration or when hardware acceleration is not enabled.

In some embodiments, the encryption/decryption module 100 and the encryption and decryption processes 300 and 320 disclosed herein may be used to solve the key-wrap problem.

In the embodiments shown in FIGS. 7 and 8, the MAC-encryption function 406 of the encryption and decryption process 300 and 320 is an AES-CTR encryption function. In some other embodiments, the encryption function 406 of the encryption and decryption process 300 and 320 may be another suitable type of AES function.

In some other embodiments, the MAC-encryption function 406 of the encryption and decryption process 300 and 320 may be a suitable AES-like cipher. In some embodiments, an AES-like cipher is defined as follows (see reference R8):

An AES-like cipher is a block cipher $E_K$ which is parametrized by a fixed key K, the state dimension M×N, the word size m, the number of rounds T and a permutation parameter $\pi = \pi_0, \ldots, \pi_{T-1}$, where each $\pi_t$ is a permutation on $\mathbb{Z}_M \times \mathbb{Z}_N$ ($\mathbb{Z}_n$ representing the group of integers modulo n and the set $\{0, 1, \ldots, n-1\}$). It is composed of round functions $\mathcal{R}_t$, subject to (s.t.) $E_K = \mathcal{R}_{T-1} \circ \ldots \circ \mathcal{R}_0$. Each round function is composed of the following bijective transformations on states, s.t. $\forall t \in \mathbb{Z}_T: \mathcal{R}_t = \text{AddRoundKey}_t \circ \text{Permute}_{\pi_t} \circ \text{MixColumns}_t \circ \text{SubBytes}$:

(i) SubBytes substitutes each word of the state according to one or several S-boxes S: $\mathbb{F}_2^m \to \mathbb{F}_2^m$, where $\mathbb{F}_2^m$ represents a m-bit binary string (i.e., each bit in the finite field of size 2).

(ii) MixColumns$_t$ applies, in round t, for all columns $j \in \mathbb{F}_N$ left-multiplication by an M×M matrix $M_j^t \in (\mathbb{F}_2^m)^{M \times M}$:

$$\text{MixColumns}_t: (\mathbb{F}_2^m)^{M \times N} \to (\mathbb{F}_2^m)^{M \times N}$$

$$\forall j \in \mathbb{F}_N: (X_{0,j}, \ldots, X_{M-1,j})^T \to M_j^t \cdot (X_{0,j}, \ldots, X_{M-1,j})^T,$$

where multiplication in $\mathbb{F}_2^m$ is defined by an arbitrary irreducible polynomial over $\mathbb{F}_2$ of degree m.

(iii) Permute$_{\pi_t}$ permutes, in round t, the words within the state due to a given permutation $\pi_t$. For a position $(i,j) \in \mathbb{F}_M \times \mathbb{F}_N$ in the state, $\pi_t(i,j)$ gives the new position of that word under the permutation $\pi_t$:

$$\text{Permute}_{\pi_t}: (\mathbb{F}_2^m)^{M \times N} \to (\mathbb{F}_2^m)^{M \times N}$$

$$\forall i \in \mathbb{F}_M, \forall j \in \mathbb{F}_N: X_{i,j} \to X_{\pi_t(i,j)}.$$

(iv) AddRoundKey$_t$ performs word-wise XOR to the state using the t-th round key.

In yet some other embodiments, the MAC-encryption function 406 of the encryption and decryption process 300 and 320 may be a suitable SPN-based encryption/decryption function.

In still some other embodiments, the MAC-encryption function 406 of the encryption and decryption process 300 and 320 may be a suitable block-cipher encryption function with same inputs and outputs of the AES (that is, receiving inputs of the tag T and the secret encryption key K2, and outputting the IV) and same properties (that is, acting as a PRF for outputting the pseudorandom IV).

In some other embodiments, the MAC-encryption function 406 of the encryption and decryption process 300 and 320 may be another suitable cipher such as Chacha20, XChacha20, and/or the like.

In the embodiments shown in FIGS. 7 and 8, the MAC-encryption function 406 of the authentication sub-process 302 and the message-encryption function 408 of the encryption sub-process 304 are the same encryption function. In some embodiments, the MAC-encryption function 406 of the authentication sub-process 302 and the message-encryption function 408 of the encryption sub-process 304 may be different encryption functions.

In the embodiments shown in FIGS. 7 and 8, the message-encryption function 408 of the encryption sub-process 304 is an AES-CTR encryption function. In some embodiments, the message-encryption function 408 of the encryption sub-process 304 may be another suitable AES encryption function, and the decryption function 424 of the decryption sub-process 322 is a corresponding AES decryption function.

In some embodiments, the message-encryption function 408 of the encryption sub-process 304 may be a block-cipher encryption function, and the decryption function 424 of the decryption sub-process 322 may be a corresponding block-cipher decryption function.

In some embodiments, the authentication sub-process 302 and the verification sub-process 324 may be used in other block-cipher encryption/decryption technologies for IV generation and verification with IV-misuse resistance.

In some other embodiments, the authentication sub-process 302 and the verification sub-process 324 may be used in any suitable encryption/decryption technologies for IV generation and verification with IV-misuse resistance.

In some embodiments, the encryption/decryption module 100 may comprise the authentication sub-process 302 and/or the verification sub-process 324 but may not comprise other modules shown in FIGS. 7 and 8 such that the encryption/decryption module 100 may be used for IV generation and/or verification in any suitable encryption/decryption apparatuses and/or systems.

In above embodiments, the encryption/decryption module 100 comprises a processor 102 functionally coupled to a memory module 104. In some alternative embodiments, the encryption/decryption module 100 may only comprise the processor 102 and use an external memory module for data storage as needed.

| C. ACRONYM KEY | |
|---|---|
| AE: | authenticated encryption |
| AEAD: | AE with associated data |
| AES: | Advanced Encryption Standard |
| AES-CBC: | AES cipher block chaining mode |
| AES-CTR: | AES counter mode |
| AES-CMAC-SIV: | AES using cipher-based message authentication code and synthetic initialization vector |
| AES-GCM: | AES Galois/counter mode |
| AES-GCM-SIV: | AES Galois/counter mode using synthetic initialization vector |
| ASICs: | application specific integrated circuits |
| CBC: | cipher block chaining |
| CMAC: | cipher-based message authentication code |
| DES: | Data Encryption Standard |
| DSS: | Digital Signature Standard |
| FPGA: | field-programmable gate array |
| GCM: | Galois/counter mode |

-continued

| C. ACRONYM KEY | |
|---|---|
| GMAC: | Galois message authentication code |
| IC: | integrated circuit |
| IETF: | Internet Engineering Task Force |
| IoT: | Internet-of-Things |
| IV: | initialization vector |
| IVs: | initialization vectors |
| KDF: | key derivation function |
| MAC: | message authentication code |
| MACs: | message authentication codes |
| NIST: | U.S. National Institute of Standards and Technology |
| PRF: | pseudo-random function |
| RSA: | Rivest-Shamir-Adleman |
| SIV: | synthetic initialization vector |
| SIVs: | synthetic initialization vectors |
| SPN: | substitution-permutation network |

D. REFERENCES (R1) P. Rogaway, T. Shrimpton, "Deterministic Authenticated-Encryption: A Provable-Security Treatment of the Key-Wrap Problem", 2007.
(R2) C. Namprempre, P. Rogaway, T. Shrimpton, "Reconsidering Generic Composition", 2014.
(R3) D. Harkins, "Synthetic Initialization Vector (SIV) Authenticated Encryption Using the Advanced Encryption Standard (AES), RFC 5297", October 2008.
(R4) S. Gueron, A. Langley, Y. Lindell, "AES-GCM-SIV: Nonce Misuse-Resistant Authenticated Encryption, RFC 8452", April 2019.
(R5) Y. Nir, A. Langley, "ChaCha20 and Poly1305 for IETF Protocols, RFC 8439", June 2018.
(R6) M. Dworkin, "Recommendation for block cipher modes of operation: Galois/Counter Mode (GCM) and GMAC." NIST Special Publication 800-38D, 2007.
(R7) M. Dworkin, "Recommendation for block cipher modes of operation, methods and techniques." NIST Special Publication 800-38A, 2001.
(R8) Christof Beierle, Philipp Jovanovic, Martin M. Lauridsen, Gregor Leander, and Christian Rechberger, "Analyzing Permutations for AES-like Ciphers: Understanding ShiftRows".

Although embodiments have been described above with reference to the accompanying drawings, those of skill in the art will appreciate that variations and modifications may be made without departing from the scope thereof as defined by the appended claims.

What is claimed is:

1. An authenticated encryption module for encrypting a message into a cipher-text, the authenticated encryption module comprising:
a processor; and
memory coupled to the processor and including instructions that, when executed by the processor, cause the processor to:
produce, using a Poly1305 function, a tag from at least a secret message authentication code (MAC) key, a nonce, and the message;
produce a pseudorandom initialization vector (IV) by encrypting the tag using a first encryption function and a secret encryption key; and
produce, using a second encryption function, the cipher-text from the secret encryption key, the produced IV, and the message.

2. The authenticated encryption module of claim 1, wherein the instructions, when executed by the processor, cause the processor to:
   produce, from a secret value using a key derivation function, the secret MAC key and the secret encryption key.

3. The authenticated encryption module of claim 1, wherein the instructions, when executed by the processor, cause the processor to:
   output a tuple comprising at least the nonce, the IV, and the cipher-text.

4. The authenticated encryption module of claim 1, wherein at least one of the first and the second encryption functions is an Advanced Encryption Standard (AES) encryption function or an AES-like encryption function.

5. The authenticated encryption module of claim 1, wherein at least one of the first and the second encryption functions is an AES counter mode (AES-CTR) encryption function.

6. The authenticated encryption module of claim 1, wherein at least one of the first and the second encryption functions is a block cipher or encryption function for outputting the pseudorandom IV.

7. A computerized authenticated encryption method for encrypting a message into a cipher-text, the authenticated encryption method comprising:
   producing, using a Poly1305 function, a tag from at least a secret message authentication code (MAC) key, a nonce, and the message;
   producing a pseudorandom IV by encrypting the tag using a first encryption function and a secret encryption key; and
   producing, using a second encryption function, the cipher-text from the secret encryption key, the produced IV, and the message.

8. The authenticated encryption method of claim 7, further comprising:
   producing, using a key derivation function, the secret MAC key and the secret encryption key from a secret value.

9. The authenticated encryption method of claim 7, further comprising:
   outputting a tuple comprising at least the nonce, the IV, and the cipher-text.

10. The authenticated encryption method of claim 7, wherein at least one of the first and the second encryption functions is an AES encryption function or an AES-like encryption function.

11. The authenticated encryption method of claim 7, wherein at least one of the first and the second encryption functions is an AES-CTR encryption function.

12. The authenticated encryption method of claim 7, wherein at least one of the first and the second encryption functions is a block cipher or encryption function for outputting the pseudorandom IV.

13. One or more non-transitory computer-readable storage devices comprising computer-executable instructions for encrypting a message into a cipher-text with authentication, wherein the instructions, when executed, cause a processor to perform actions comprising:
   producing, using a Poly1305 function, a tag from at least a secret message authentication code (MAC) key, a nonce, and the message;
   producing a pseudorandom IV by encrypting the tag using a first encryption function and a secret encryption key; and
   producing, using a second encryption function, the cipher-text from the secret encryption key, the produced IV, and the message.

14. The one or more non-transitory computer-readable storage devices of claim 13, wherein the instructions, when executed, cause the processor to perform further actions comprising:
   producing, using a key derivation function, the secret MAC key and the secret encryption key from a secret value.

15. The one or more non-transitory computer-readable storage devices of claim 13, wherein the instructions, when executed, cause the processor to perform further actions comprising:
   outputting a tuple comprising at least the nonce, the IV, and the cipher-text.

16. The one or more non-transitory computer-readable storage devices of claim 13, wherein at least one of the first and the second encryption functions is an AES encryption function or an AES-like encryption function.

17. The one or more non-transitory computer-readable storage devices of claim 13, wherein at least one of the first and the second encryption functions is an AES-CTR encryption function.

18. The one or more non-transitory computer-readable storage devices of claim 13, wherein at least one of the first and the second encryption functions is a block cipher or encryption function for outputting the pseudorandom IV.

* * * * *